United States Patent [19]
Lester

[11] 3,780,392
[45] Dec. 25, 1973

[54] MICRO-ORGANISM CONTROL COMPOSITION AND DUST CLOTH THEREWITH
[75] Inventor: David Lester, Cambridge, Mass.
[73] Assignee: Quatek, Inc., Waltham, Mass.
[22] Filed: July 9, 1971
[21] Appl. No.: 161,291

[52] U.S. Cl.................. 15/104.93, 15/1.5, 252/91, 424/25
[51] Int. Cl. ....................... A47l 13/17, C11d 17/04
[58] Field of Search............. 15/1.5, 104.93, 104.94

[56] References Cited
UNITED STATES PATENTS
1,056,067   3/1913   Sporer ............................ 15/104.93
3,208,093   5/1960   Hansen ........................... 15/104.93
2,955,962   10/1960  Engdahl ....................... 15/104.93 X

*Primary Examiner*—Daniel Blum
*Attorney*—Gerald Altman et al.

[57] ABSTRACT

A dust cloth comprises a tacky vinyl adhesive that causes dust retrieval and retention, a low molecular weight polyalcohol lubricant for masking the adhesive in order to enable slip, and a bio-active material for micro-organisms retrieved and retained.

2 Claims, No Drawings

3,780,392

MICRO-ORGANISM CONTROL COMPOSITION AND DUST CLOTH THEREWITH

BACKGROUND AND SUMMARY

The present invention relates to compositions for controlling micro-organisms and dust cloths therewith and, more particularly, to a novel micro-organism control dust cloth designed for hospital, commerical and home use. Prior dust cloths have suffered from: poor retrieval and retention of dust; no bio-activity or ineffecient or transient bio-activity; and tendency to attach furniture finish or to leave oily residue.

The object of the present invention is the provision of a bio-active material, i.e. bacteriocidal, bacteriostatic, fungicidal, or fungistatic, which is capable of retrieval and retention of dust in an amount equal to the weight of the fabric itself, and which is non-toxic, chemically inactive in normal cleaning contexts, and leaves no residue behind on dusted surfaces. Specifically, the composition of the present invention comprises a tacky vinyl adhesive that causes dust retrieval by generating a static electrical charge and that retains such dust permanently by adhesion, a low molecular weight polyalcohol lubricant for masking the adhesive in order to enable slip while being a volatile residue when released from the cloth, and a bio-active material for micro-organisms retrieved and retained by the cloth.

Other objects of the present invention will in part be obvious and will in part appear hereinafter.

The present invention thus provides a composition and a product, having components, parts, and interrelationships, which are exemplified in the following disclosure, the scope of which will be indicated in the appended claims.

For a fuller understanding of the nature and objects of the present invention, reference now is made to the following detailed description.

DETAILED DESCRIPTION

The composition of the present invention comprises, in the broadest sense, a tackifier for retrieving and dust, lubricant for preventing the tackifier from adhering to a surface to which it is applied, a surfactant capable of causing the composition to permeate into a fabric, a defoamer that prevents streaking in a fabric in which the composition is permeated and a bio-active ingredient that is compatable with the other ingredients of the composition for bacteriocidal, bacteriostatic, fungicidal, and fungistatic purposes.

The tackifier is a pressure sensitive adhesive, such as veinyl acetate copolymerized with a high molecular acrylic. A specific example of such a tackifier is 2-ethyl hexyl acrylate. The lubricant preferably is an organic wetting agent, which is retained durably until the composition contacts a surface, transfers slightly to such a surface, and evaporates when free of the composition. Preferred lubricants are low molecular weight polyalcohols, such as 1,3 butylene glycol, 1,4 butane diol, glycerine, hexylene glycol, and 1,2 propane diol. All of the foregoing are alihpatic polyhydric materials which are liquid in state. The essential relationship between the tackifier and the lubricant is that they be physically compatible, i.e. miscible in the given proportions.

Preferably, the surfactant is non-ionic, the purpose being to enable wetting of the cloth without acting as a solvent for the tackifier. A preferred surfactant is an aliphatic or aromatic compound characterized by six to twelve mols of ethylene oxide condensed onto the aliphatic or aromatic structure. In other words, the surfactant comprises an ethylene oxide condesnate, the ethylene oxide functional groups of which contain from six to twelve mols of ethylene oxide. One compound of this class, for example, in nonyl phenol ethylene oxide condensate with 10 mols of ethylene oxide. The defoamer whic does not serve a primary function insofar as dust collection and bio-activity is concerned, serves its primary function in processing control, i.e. application of the composition to a cloth. A foam, if it were to be generated, would streak the cloth, i.e. permeate the composition into the cloth unevenly. Preferably the silicone defoamer is a silicone oil, ranging from 200 to 600 in molecular weight.

The bio-active component, for example, is a quaternary ammonium compound such as quaternary ammonium chloride. However, other bacteriocidal, or bacteriostatic, fungicidal or fungistatic materials that may be used include halogenated compounds such as hexachlorophene and trichlorophenol.

Preferably, the composition is of the following formulation, by weight:

| Ingredient | Parts by Weight |
| --- | --- |
| Water | 100 |
| Vinyl Resin | 25–45 |
| Polyalcohol | 15–35 |
| Surfactant | .1–5 |
| Defoamer | 0.1–5 |
| Quaternary ammonium compound or equivalent | .05–4 |
| Pigment | 0–20 |

Preferably the initial solids range from 5 to 55 parts by weight. Following immersion of the cloth in this aqueous composition, the cloth is removed from the composition and heated at a temperature of between 100° and 350° F. until moisture is reduced to less thant 4 percent of the composition by total weight. Following the heat treatment, moisture concentration by total weight regains to approximately 5 percent. The final deposition on the cloth is characterized by an add on weight ranging between 15 and 30 percent by total weight.

The following non-limiting example further illustrates the present invention.

EXAMPLE I

A composition of the following formulation was mixed:

| Ingredient | Parts by Weight |
| --- | --- |
| Polyvinyl acetate polymer (55% solids) | 36.0 |
| Glycerine | 25.0 |
| Nonyl phenol ethylene oxide condensate having from 6 to 12 mols ethylene oxide | 1.0 |
| Quaternary ammonium chloride (50%) | 2.0 |
| Titanium dioxide pigment (40%) | 9.0 |

The ingredients are mixed in accordance with the foregoing formula, the total solids being in the range of 10 to 35 percent by total weight. An open mesh fabric is immersed in this aqueous composition, withdrawn from the composition, and thereafter heated for 1 minute at 300°F. in an appropriate oven until 1 to 4 percent moisture remains. It has been found that an add on of 15 to 25 percent solids by total weight gives the best results.

In operation, a dust cloth prepared in the foregoing manner, is widely useful in hospitals, households and for anti-allergy purposes. Tests by an independent laboratory indicate the unique and unmatched microorganism control nature afforded by this product. Rigid testing using *Staphylycoccus Aureous* and *E Coli* indicates that a cloth treated with the foregoing composition will remove and kill virtually all bacteria from the dusted surface. Hospitals can use the dust cloths to prevent cross ward contamination while removing and killing bacteria from dusted furniture, floors, walls, etc. The dust cloth can be used as a hand wiper or as a wrap around for brooms and dust mops.

EXAMPLE II

A test of the materials of EXAMPLE I was made as follows, Seeded agar plates were prepared by pouring agar in a thin layer on a number of plates and allowed to harden. There were five plates per test organism per sample, one control plate per test organism for seeded control, plus one plate only for sterile agar control. Flasks of sterile agar were inoculated at 45 to 48°C. with two to four drops of test organism broth cluture. One inch squares of the test sample were placed on each of five freshly seeded plates of each test organism. The plates were refrigerated for between 18 and 24 hours to allow the bio-active agent in the sample to diffuse into the seeded plate. These test samples were removed from the refrigerator and incubated for required time and temperature. The number of sides of squares showing distinct zones of inhibition were read and recorded. The effective bio-activity was indicated when at least 18 of the 20 edges showed distinct zones of inhibition.

The present invention thus provides a composition and a dust cloth characterized by the following unique properties: high dust retrieving holding power; non-oil treated and therefore no oily deposit left on table tops; excellent bacteriocidal, fungicidal, bacteriostatic and/or fungistatic activity; unusual durability. Since certain changes may be made in the foregoing disclosure without departing from the scope of the present invention, it is intended that all matter contained in the foregoing description be interpreted in an illustrative and not in a limiting sense.

What is claimed is:

1. A dustcloth comprising a fibrous mass impregnated with a composition for controlling microorganisms, said composition comprising, by total weight, approximately 5 parts of water, from 25 to 45 parts of vinyl resin, from 15 to 35 parts of polyalcohol, from 0.1 to 5 parts of surfactant, from 0.1 to 5 parts of a defoamer, from 0.05 to 4 parts of quaternary ammonium compound, and from 0 to 20 parts of a pigment.

2. The dustcloth of claim 1 wherein said vinyl resin is polyvinyl acetate polymer.

* * * * *